US010670040B2

(12) United States Patent
Nolcheff et al.

(10) Patent No.: US 10,670,040 B2
(45) Date of Patent: Jun. 2, 2020

(54) CORE-PROTECTING FAN MODULES AND TURBOFAN ENGINES CONTAINING THE SAME

(71) Applicant: HONEYWELL INTERNATIONAL INC., Morris Plains, NJ (US)

(72) Inventors: Nick Nolcheff, Chandler, AZ (US); John Repp, Gilbert, AZ (US); Jeffrey Hayes, Apache Junction, AZ (US); John A Gunaraj, Chandler, AZ (US); Yoseph Gebre-Giorgis, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 658 days.

(21) Appl. No.: 15/439,430

(22) Filed: Feb. 22, 2017

(65) Prior Publication Data
US 2018/0238341 A1  Aug. 23, 2018

(51) Int. Cl.
F04D 29/32 (2006.01)
F04D 29/54 (2006.01)
(Continued)

(52) U.S. Cl.
CPC ........... F04D 29/325 (2013.01); B64D 33/02 (2013.01); F01D 5/021 (2013.01); F01D 5/141 (2013.01);
(Continued)

(58) Field of Classification Search
CPC ...... F02C 7/05; F02C 7/052; F05D 2260/607; B64D 2033/022; B64D 2033/0246;
(Continued)

(56) References Cited

U.S. PATENT DOCUMENTS 3,494,129 A * 2/1970 Krebs ................. F02K 3/06
                                                      415/144
4,129,984 A  12/1978 Nelson
(Continued)

FOREIGN PATENT DOCUMENTS

EP  2022988 A1  2/2009
EP  2037126 A1  3/2009
EP  2128450 A1  12/2009

OTHER PUBLICATIONS

Extended EP Search Report for Application No. 18157436.9 dated Aug. 27, 2018.

Primary Examiner — Philip E Stimpert
(74) Attorney, Agent, or Firm — Lorenz & Kopf, LLP

(57) ABSTRACT

Embodiments of a core-protecting fan module are provided, as are embodiments of a turbofan engine containing such a fan module. In an embodiment, the core-protecting fan module contains a nose member, a fan rotor downstream of the nose member, a full span stator downstream of the fan rotor, and a splitter structure downstream of the fan rotor. The fan rotor includes a plurality of fan blades, which extends from a rotor hub and which is angularly spaced about a rotational axis. Certain fundamental angular relationships are observed between the angles formed by rotational axis, the nose member, the fan rotor, and a leading edge of the splitter structure to reduce contaminant ingestion by the core flow path and to promote moisture shedding to reduce susceptibility to icing within the fan module, while further avoiding or minimizing negative impacts to other structural and functional aspects of the turbofan engine.

18 Claims, 2 Drawing Sheets

(51) Int. Cl.
| | |
|---|---|
| *F04D 29/34* | (2006.01) |
| *F01D 5/14* | (2006.01) |
| *F01D 5/34* | (2006.01) |
| *F02K 3/06* | (2006.01) |
| *F01D 5/02* | (2006.01) |
| *F02C 7/05* | (2006.01) |
| *B64D 33/02* | (2006.01) |
| *B64C 11/14* | (2006.01) |

(52) U.S. Cl.
CPC .................. *F01D 5/34* (2013.01); *F02C 7/05* (2013.01); *F02K 3/06* (2013.01); *F04D 29/34* (2013.01); *F04D 29/541* (2013.01); *B64C 11/14* (2013.01); *B64D 2033/0233* (2013.01); *F05D 2220/323* (2013.01); *F05D 2220/36* (2013.01); *F05D 2240/12* (2013.01); *F05D 2240/20* (2013.01); *Y02T 50/671* (2013.01); *Y02T 50/673* (2013.01)

(58) Field of Classification Search
CPC ....... F04D 29/325; F01D 5/021; B65D 33/02; B64C 11/14
See application file for complete search history.

(56) References Cited

U.S. PATENT DOCUMENTS

| | | | |
|---|---|---|---|
| 4,393,650 A * | 7/1983 | Pool | F02C 7/047 416/132 R |
| 4,790,725 A | 12/1988 | Bousquet et al. | |
| 5,182,906 A | 2/1993 | Gilchrist et al. | |
| 6,568,077 B1 * | 5/2003 | Hellemann | B23K 9/044 29/889.1 |
| 7,596,938 B2 * | 10/2009 | Bart | F02C 7/05 415/212.1 |
| 10,167,088 B2 * | 1/2019 | Clark | B64D 33/02 |

* cited by examiner

CORE-PROTECTING FAN MODULES AND TURBOFAN ENGINES CONTAINING THE SAME

TECHNICAL FIELD

The present invention relates generally to gas turbine engines and, more particularly, to turbofan engines containing core-protecting fan modules, which minimize the amount of water and other foreign object debris entering the core flow path during engine operation.

BACKGROUND

Turbofan engines are engineered to maintain high performance operation when subject to adverse environmental conditions, such as icing conditions and conditions under which relatively large amounts of Foreign Object Debris (FOD) are ingested into the engine. Certain turbofan engines are equipped with anti-icing devices to heat forward regions of the engine and, specifically, regions of the fan module prone to icing. Such anti-icing devices are generally effective at deterring the formation of ice within the fan module, but add undesired cost, weight, and complexity to the fan module. Additionally, anti-icing devices do little to prevent FOD, such as particulate matter (e.g., sand), low temperature moisture (e.g., ice crystals, hail, or super-cooled water droplets), and larger debris (e.g., bird fragments generated by bird strike) from entering the core flow path of the turbofan engine. While it may generally be possible to reduce the quantity of FOD directed into the core flow path of a turbofan engine by modifying certain design parameters of the engine's fan module, such design modifications often negatively impact other interrelated physical or operational aspects of the turbofan engine, such as aerodynamic performance, length, weight, and/or engine complexity.

There thus exists an ongoing demand for the provision of core-protecting fan modules, which reduce the quantity of contaminants entering the core flow path of a turbofan engine during operation. It would be desirable for such core-protecting fan modules to have an overall weight, size, complexity, and aerodynamic performance levels comparable to conventional fan modules lacking enhanced core protection properties. Ideally, embodiments of such core-protecting fan modules would further deter the formation and accretion of ice within the fan module when exposed to icing conditions, preferably without requiring the incorporation of anti-icing devices into the fan module. Other desirable features and characteristics of the present invention will become apparent from the subsequent Detailed Description and the appended Claims, taken in conjunction with the accompanying Drawings and the foregoing Background.

BRIEF SUMMARY

Embodiments of a core-protecting fan module for usage within a turbofan engine are provided. During operation of the turbofan engine, the core-protecting fan module reduces the quantity of contaminants, such as moisture and Foreign Object Debris (FOD), directed into the core flow path of the turbofan engine. In one embodiment, the core-protecting fan module contains a nose member, a fan rotor downstream of the nose member, a full span stator downstream of the fan rotor, and a splitter structure downstream of the fan rotor. The fan rotor includes, in turn, a rotor hub and a plurality of fan blades, which is angularly spaced about a rotational axis. In a cross-section plane containing the rotational axis, the rotational axis forms: (i) a first angle ($\theta_1$) with a line extending from a foremost or leading intersection between the rotational axis and the nose member ($P_{N\_LE}$) to a point at which the rotor hub intersects a leading edge of a first fan blade included in the plurality of fan blades ($P_{B\_LE\_IN}$); (ii) a second angle ($\theta_2$) with a line extending from $P_{B\_LE\_IN}$ to a point at which the rotor hub intersects a trailing edge of the first fan blade ($P_{B\_TE\_IN}$); and (iii) a third angle ($\theta_3$) with a line extending from $P_{B\_TE\_IN}$ to a leading edge of the splitter structure ($P_{SPLIT\_LE}$). The core-protecting fan module is designed such that the first angle is greater than the third angle ($\theta_1 > \theta_3$), the second angle is greater than the third angle ($\theta_2 > \theta_3$), and the first angle is less than the sum of the second and third angles ($\theta_1 < \theta_2 + \theta_3$). Additionally, in an embodiment wherein the nose member has a radius ($R_N$) measured in a radial direction from $P_{N\_LE}$ to $P_{B\_LE\_IN}$ and further has a length ($L_N$) measured in a longitudinal direction from $P_{N\_LE}$ to $P_{B\_LE\_IN}$, the radius and length of the nose member may be selected such that $$0.5 \leq \frac{R_N}{L_N} \leq 0.65.$$

In another embodiment, the core-protecting fan module includes a full span stator having a plurality of stator vanes, a fan rotor upstream of the full span stator, and a nose member. The fan rotor includes, in turn, a plurality of fan blades extending from a rotor hub and angularly spaced about a rotational axis. In certain implementations, the plurality of fan blades may consist of n number of fan blades, wherein $16 \leq n \leq 24$. The nose member is positioned adjacent and upstream of the rotor hub. Additionally, the nose member includes: (i) a radius ($R_N$) measured in a radial direction from a foremost intersection between the rotational axis and the nose member ($P_{N\_LE}$) to an intersection between the rotor hub and a leading edge of a first fan blade in the plurality of fan blades ($P_{B\_LE\_IN}$), and (ii) a length ($L_N$) measured in a longitudinal direction from $P_{N\_LE}$ to $P_{B\_LE\_IN}$. An aspect ratio of the nose member is selected such that $$0.5 \leq \frac{R_N}{L_N} \leq 0.65.$$

This structural relationship between the nose member aspect ratio and fan blade count has been found to greatly reduce contaminant ingestion by the core flow path and to promote moisture shedding to reduce susceptibility to icing, while further avoiding or minimizing negative impacts to other structural and functional aspects of the turbofan engine.

Embodiments of a turbofan engine containing a core-protecting fan module are further provided. In an embodiment, the turbofan engine includes a compressor section and a fan module, which is located forward or upstream of the compressor section. The fan module contains a nose member, a fan rotor downstream of the nose member, a full span stator downstream of the fan rotor, and a splitter structure downstream of the fan rotor. The fan rotor includes, in turn, a rotor hub and a plurality of fan blades, which is angularly spaced about a rotational axis. In a cross-section plane containing the rotational axis, the rotational axis forms: (i) a first angle ($\theta_1$) with a line extending from a foremost intersection between the rotational axis and the nose member ($P_{N\_LE}$) to a point at which the rotor hub intersects a leading edge of a first fan blade included in the plurality of fan blades ($P_{B\_LE\_IN}$); (ii) a second angle ($\theta_2$) with a line extending from $P_{B\_LE\_IN}$ to a point at which the rotor hub intersects a trailing edge of the first fan blade ($P_{B\_TE\_IN}$); and (iii) a third angle ($\theta_3$) with a line extending from $P_{B\_TE\_IN}$ to a leading edge of the splitter structure. The core-protecting fan module is designed such that the first angle is greater than the third angle ($\theta_1 > \theta_3$), the second angle is greater than the third angle ($\theta_2 > \theta_3$), the first angle is less than the sum of the second and third angles ($\theta_1 < \theta_2 + \theta_3$), and the first angle ranges inclusively from 27 degrees) (°) to 33° ($27° \leq \theta_1 \leq 33°$).

BRIEF DESCRIPTION OF THE DRAWINGS

At least one example of the present invention will hereinafter be described in conjunction with the following figures, wherein like numerals denote like elements, and.

Figure 1:
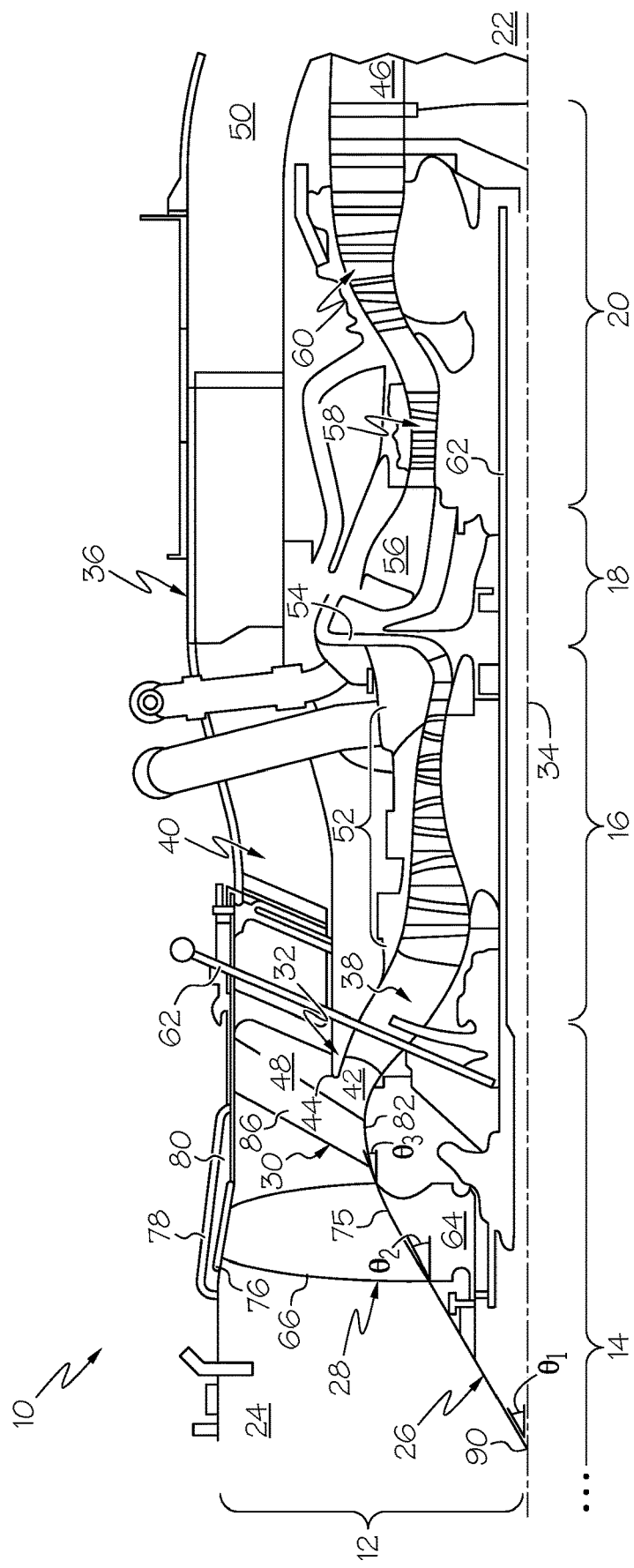
FIG. 1 is a cross-sectional schematic illustrating an exemplary turbofan engine (partially shown) including a core-protecting fan module, as illustrated in accordance with an exemplary embodiment of the present disclosure.
Figure 2:
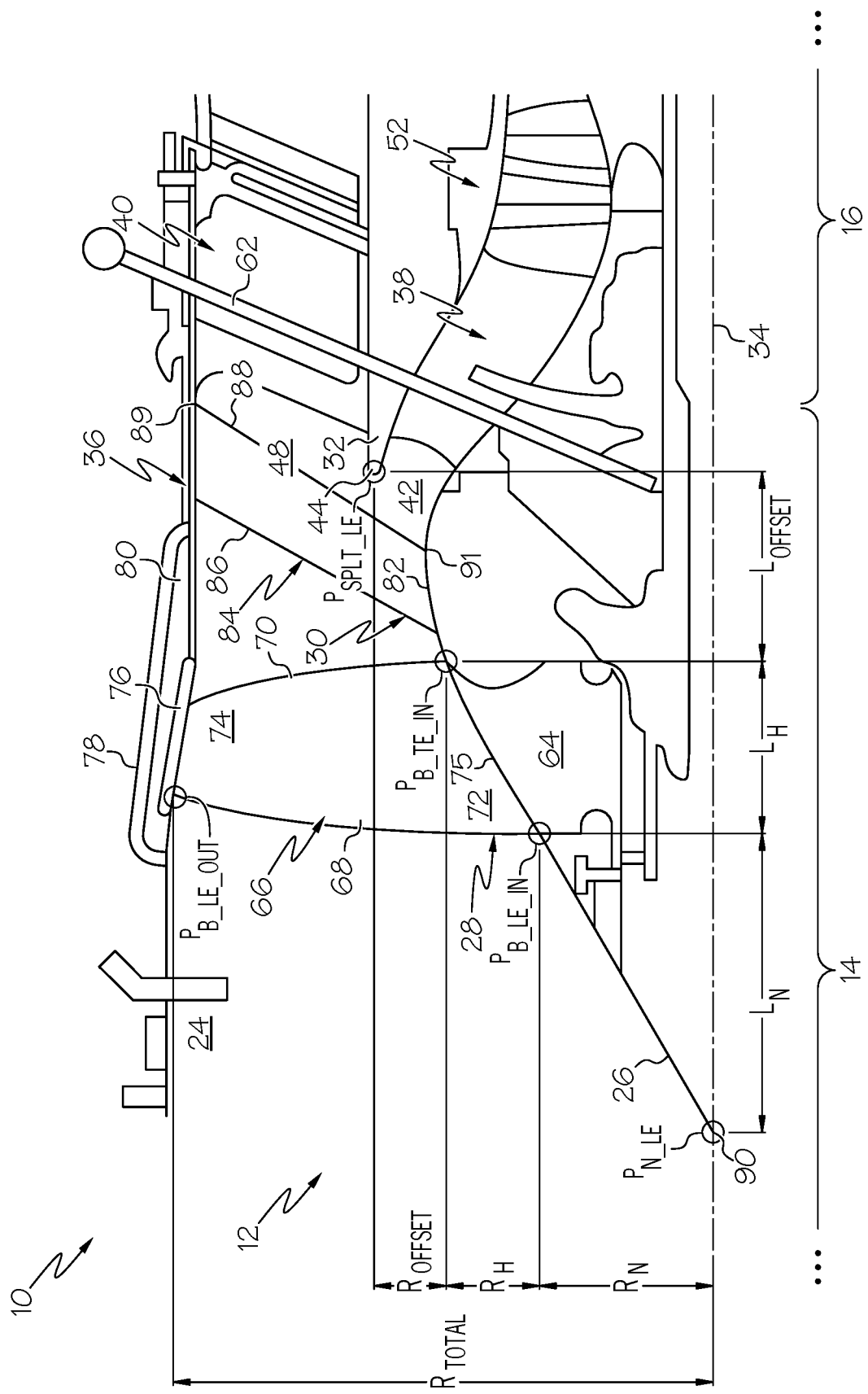
FIG. 2 is a cross-sectional schematic illustrating the core-protecting fan module of FIG. 1 in greater detail and identifying multiple fundamental dimensional relationships, which can be tailored to increase the resistance of the fan module to icing, while reducing the quantity of contaminants ingested by the core flow path during engine operation.

The cross-sectional schematics of FIGS. 1-2 are not drawn to scale such that certain dimensions or spatial relationships may be exaggerated or otherwise varied for purposes of illustration.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

As appearing herein, the terms "axial" and "longitudinal" are defined as a direction parallel to the centerline or rotational axis of the below-described core-protecting fan module or, more generally, a turbofan engine containing the fan module. Conversely, the term "radial" is defined as a direction perpendicular to the axial direction. Furthermore, the terms "inboard" and "outboard" are utilized in a relative sense and defined with respect to proximity to the rotational axis or centerline of a fan module or turbofan engine. Thus, a first component or feature may be described as an "inboard" component or feature when located closer to the rotational axis of a fan module or turbofan engine as compared to a second, similar component or feature, which may be referred to as the "outboard" component or feature. Finally, as still further appearing herein, the term "active flow anti-icing device" refers to a system or device employing a circulating liquid or directed airflow to heat regions of a fan module prone to icing.

As indicated in the foregoing section entitled "BACKGROUND," there exists an ongoing demand for fan modules providing enhanced icing resistance and reduced ingestion of contaminants into the core flow path of a turbofan engine without incurring significant penalties to other key physical and functional properties of the engine. This is despite the presence of hundreds, if not several thousand commercially-available turbofan engine models containing fan modules, examples of which include: the HTF7000 family of turbofan engines, including the AS907-1-1A engine, developed and commercially marketed by Honeywell International, Inc. (the assignee of the present application); the PW610 and PW1127 turbofan engines commercially marketed by Pratt & Whitney Canada and Pratt & Whitney United States, respectively; and the CF34-8C turbofan engine commercially marketed by General Electric. In many, if not all cases, the aforementioned turbofan engine platforms, and the fan modules contained therein, do not achieve the same or substantially equivalent level of favorable core protection and inherent anti-icing properties as do embodiments of the below-described core-protecting fan module, while further minimizing the overall weight, size, complexity, and aerodynamic performance characteristics of the turbofan engine.

Generally, there exists numerous different fan module design parameters that can potentially be modified or tailored, by design, to reduce contaminant ingestion by the core flow path of a turbofan engine. Such design parameters are, however, inextricably linked to other operational and structural characteristics of the turbofan engine. Thus, while certain design parameters can be modified to reduce the quantity of contaminants directed into the core flow path, such modifications often result in undesirable tradeoffs in engine weight, size, complexity, and cost, as well as reductions in aerodynamic efficiency. Fan modules providing such enhanced core protection with little to no detriment to other fundamental engine attributes have thus proven elusive and generally incapable of discovery through mere routine experimentation, such as trial-and-error design and testing. A long felt need has consequently developed within the aerospace industry for fan modules having enhanced core protection properties, while also having an inherent resistance to icing even when lacking dedicated anti-icing devices. In this context, the present inventors have made the surprising and useful discovery that fan modules having such desirable characteristics can be designed and fabricated, if certain precise, fundamental structural relationships are observed. Examples of such structural relationships will now be described in conjunction with an exemplary and non-limiting embodiment of a core-protecting fan module.

FIG. 1 is a simplified cross-sectional view of an exemplary turbofan engine 10 including a core-protecting fan module 12, as illustrated in an exemplary and non-limiting embodiment of the present disclosure. Turbofan engine 10 is suitable for usage onboard an aircraft as a propulsive gas turbine engine. Turbofan engine 10 includes a number of engine sections, which are disposed in flow series and which may be generally axisymmetric about the centerline or rotational axis of engine 10 (represented by dashed line 34). Specifically, turbofan engine 10 includes an intake section 14 (containing or defined by fan module 12), a compressor section 16, a combustion section 18, a turbine section 20, and an exhaust section 22. Engine sections 14, 16, 18, 20, 22 are surrounded or enclosed by a tubular engine case 36, which is also substantially axisymmetric about rotational axis 34. Turbofan engine 10 also includes other non-illustrated components, such as a nacelle further surrounding engine case 36. Additionally, intake section 14 may extend to the left of the illustrated portion of turbofan engine 10 (that is, in an upstream direction) and also encompass a region of space enclosed by the non-illustrated nacelle surrounding engine case 36.

Core-protecting fan module 12 includes an intake opening or flow path 24, a nose member 26, a fan rotor 28, a fan stator 30, and a splitter structure 32. In the illustrated example, core-protecting fan module 12 is a single stage fan module; that is, fan module 12 includes a single fan rotor 28 followed by a single fan stator 30. Both fan rotor 28 and fan stator 30 include multiple airfoils (typically referred to as blades in the case of rotor 28 and vanes in the case of stator 30), which are angularly spaced about rotational axis 34 and further described below. During operation of turbofan engine 10, fan rotor 28 spins about rotational axis 34, while fan stator 30 and splitter structure 32 remain static or rotationally fixed with respect to engine case 36. Nose member 26 may or may not rotate about rotational axis 34 in conjunction with fan rotor 28. In embodiments wherein nose member 26 rotates about rotational axis 34, nose member 26 is commonly referred to as a "spinner nose" or simply a "spinner." Regardless of whether nose member 26 rotates during operation of fan module 12 and turbofan engine 10, nose member 26 is beneficially imparted with an aerodynamically-streamlined geometry, which may be either axisymmetric or non-axisymmetric about rotational axis 34. For example, nose member 26 may be imparted with a substantially conical geometry (shown in FIG. 1), a bullet-shaped geometry, or another contoured shape.

Splitter structure 32 serves to fluidly separate or partition air flowing along intake airflow path 24 between an inner core flow path 38 and an outer bypass flow path 40. Splitter structure 32 may assume any structural form suitable for providing this function, including that of an annular or tubular cowl. Splitter structure 32 includes a foremost or leading edge 44, which may have a rounded or contoured geometry and which initially divides the intake airflow between flow paths 38, 40. Additionally, the body of splitter structure 32 extends aftward from leading edge 44 in an axial direction to further partition inner core flow path 38 and outer bypass flow path 40. By virtue of this design, an upstream or leading portion of bypass flow path 40 is bound along its outer periphery by an inner circumferential surface of engine case 36 and along its inner periphery by an outer circumferential surface of splitter structure 32. In comparison, an upstream portion of core flow path 38 is bound along its outer periphery by an inner circumferential surface of splitter structure 32 and is at least partially bound along its inner periphery by an outer circumferential surface of fan stator 30.

With continued reference to FIG. 1, inner core flow path 38 extends through sections 16, 18, 20 of turbofan engine 10 and may be substantially coaxial with outer bypass flow path 40 and with rotational axis 34. Inner core flow path 38 includes a mouth or inlet 42 and an outlet 46. Inlet 42 of core flow path 38 is located within or immediately downstream of core-protecting fan module 12, while outlet 46 is located downstream of turbine section 20. Inlet 42 of core flow path 38 has a generally annular geometry and extends around rotational axis 34. Inlet 42 is partially defined and circumscribed by leading edge 44 of splitter structure 32. As does inner core flow path 38, outer bypass flow path 40 likewise includes a mouth or inlet 48 and an outlet 50. Inlet 48 of outer bypass flow path 40 has a generally annular geometry, extends around rotational axis 34, and circumscribes leading edge 44 of splitter structure 32. Outer bypass flow path 40 thus extends over and around compressor section 16, combustion suction 18, and turbine section 20. During engine operation, bypass flow path 40 directs relatively cool bypass airflow over and around inner core flow path 38. The relatively cool bypass airflow may be utilized for cooling purposes and is ultimately discharged from outlet 50 into exhaust section 22 for mixing with the relatively hot combustive gas flow discharged from turbine section 20.

Compressor section 16 contains one or more compressor stages 52. In many cases, compressor section 16 will include multiple axial compressor stages and may (or may not) terminate in a radial compressor stage. One or more diffuser flow passages 54 fluidly connect the final compressor stage of compressor section 16 to a combustion chamber 56 contained within combustion section 18. During operation of turbofan engine 10, compressed airflow is delivered from compressor section 16 into combustion chamber 56. Within combustion chamber 56, the compressed airflow is mixed with injected fuel and ignited to generate combustive gasses. The combustive gasses are then discharged from combustion chamber 56 and rapidly expand through the turbine stage or stages contained within turbine section 20. In the example of FIG. 1, specifically, the combustive gas flow may be directed through a High Pressure (HP) turbine stage 58 and subsequently through a Low Pressure (LP) turbine stage 60 located within turbine section 20 to drive rotation of the turbine rotors contained therein. The combustive gas flow then exits turbine section 20 for mixture with the cooler bypass airflow and is ultimately discharged from turbofan engine 10 through exhaust section 22.

The turbine rotors contained within turbine stages 58, 60, the compressor rotors contained within compressor stages 52, and fan rotor 28 contained within core-protecting fan module 12 are mechanically linked by one or more shafts. For example, in a two spool turbofan engine platform, the turbine rotors contained within HP turbine stage 58 may be rotationally fixed to the compressor rotors contained within compressor section 16 by a HP shaft, while the turbine rotors contained within LP turbine stage 60 may be rotationally fixed to fan rotor 28 by a coaxial LP shaft. In other embodiments, turbofan engine 10 may be a single spool engine or a multi-spool engine containing more than two coaxial shafts. As will readily be appreciated, turbofan engine 10 further includes various other structures and components (e.g., a monopole sensor 62, a tower shaft, rolling element bearings, etc.) within engine sections 14, 16, 18, 20, 22, which are not shown in FIG. 1 or described herein in the interests of concision. Furthermore, the particular features of engine sections 16, 18, 20, 22 will vary between different turbofan engine platforms and should not be construed to restrict the scope of the present invention in any manner. In a similar regard, core-protecting fan module 12 is presented by way of non-limiting example only and will inevitably vary in construction and appearance across different embodiments of the present disclosure. This understood, core-protecting fan module 12 will now be described in greater detail in conjunction with FIG. 2.

FIG. 2 illustrates core-protecting fan module 12 and a leading or forward portion of compressor section 16 in greater detail. Referring jointly to FIGS. 1-2, fan rotor 28 includes a rotor disk 64 from which a plurality of fan blades 66 extends. As labeled in FIG. 2, fan blades 66 each include leading edge 68, an axially-opposed trailing edge 70, a base or root portion 72, and a radially-opposed tip portion 74. While only one fan blade 66 can be seen in the cross-sections of FIGS. 1-2, fan rotor 28 includes multiple blades 66, which are angularly spaced (evenly or unevenly) about rotational axis 34. Fan blades 66 are arranged in a ring or annular array surrounded by a static fan shroud 76. Static fan shroud 76 is, in turn, circumscribed by an annular housing piece 78 defining a containment pocket 80. In one embodiment, fan blades 66 are integrally formed with fan rotor disk 64 as a monolithic or single piece structure commonly referred to as a bladed disk or "blisk." In other embodiments, fan blades 66 may be insert-type blades, which are received in mating slots provided around the outer periphery of rotor disk 64. In still further embodiments, fan rotor 28 may have a different construction. Regardless of its construction, fan rotor 28 includes a rotor hub 75 defining a hub flow path. The hub flow path extends over the outer surface of fan rotor 28 and between fan blades 66 to guide airflow along from the inlet end (inducer or leading edge) to the outlet end (exducer or trailing edge) of rotor 28.

In a manner similar to fan rotor 28, fan stator 30 includes a stator hub 82 and a plurality of stator vanes 84 (again, only one of which can be seen in FIGS. 1-2). Stator vanes 84 extend outwardly from stator hub 82 and are angularly spaced about rotational axis 34, whether at regular or irregular intervals. Stator vanes 84 are usefully, but not necessarily produced to have airfoil-shaped geometries. Stator hub 82 is located between fan rotor 28 and splitter structure 32, as taken along rotational axis 34. Similarly, stator vanes 84 are predominately located between fan rotor 28 and splitter structure 32, as taken along rotational axis 34. In the illustrated example, stator vanes 84 extend in a radially outward direction from stator hub 82 to engine case 36 without encountering or intersecting splitter structure 32. For this reason, fan stator 30 is properly classified as "full span stator"; the term "full span stator" referring to a stator including stator vanes extending radially from a stator hub to an outer structure (e.g., an engine case) without intersecting a splitter structure. As described more fully below, the full span design of stator 30 may provide certain aerodynamic performance benefits and/or may decrease the likelihood of the ingestion of fractured stator vanes pieces or bird fragments in the unlikely event of impact between a bird (or a bird part) and one or more of stator vanes 84.

Stator vanes 84 each include a leading edge 86 and an axially-opposed trailing edge 88. In the illustrated example, stator vanes 84 are tilted in an aftward direction (more informally, "leaned back") as considered when moving in a radially outward direction. Additionally, stator vanes 84 are positioned in relative close proximity to splitter structure 32. This combination of structural characteristics tends to minimize undesirable aerodynamic effects at outboard portions of stator vanes 84 downstream of fan blades 66, while further imparting fan module 12 with a relatively axially-compact geometry. As a result of the aftward tilt of stator vanes 84 and the relative proximity of vanes 84 to splitter structure 32, an inboard portion of each stator vane 84 may be located forward of leading edge 44 of splitter structure 32, while an outboard portion of each stator vane 84 may be located aft of splitter structure leading edge 44, as taken along rotational axis 34. Stated more specifically, the juncture between trailing edge 88 of each stator vane 84 and engine case 36, which is identified in FIG. 2 by reference numeral "89," may be located aft of leading edge 44 of splitter structure 32, as taken along rotational axis 34. Concurrently, the juncture between stator hub 82 and trailing edge 88 of the illustrated stator vane 84, which is identified in FIG. 2 by reference numeral "91," may be located forward of leading edge 44 of splitter structure 32, as taken along axis 34.

As previously noted, it has been determined that relatively compact, lightweight, and aerodynamically-efficient core-protecting fan modules, which not only provide enhanced core protection properties, but which also provide an inherent resistance to icing, can be produced if certain relatively focused, fundamental structural interrelationships or design rules are obeyed. Examples of such fundamental structural relationships are described in detail below. First, however, several key reference points, dimensions, and angles are introduced to enable the below-described structural relationships to be clearly defined.

Multiple reference points are called-out by circular graphics in FIG. 2 and identified as "$P_{N\_LE}$," "$P_{B\_LE\_IN}$," "$P_{B\_TE\_IN}$," "$P_{SPLT\_LE}$," and "$P_{B\_LE\_OUT}$." In this naming convention, the letters "P," "N," and "B," denote "position," "nose," and "blade," respectively; while the abbreviations "LE," "TE," "IN," "OUT," and "SPLT" denote "leading edge," "trailing edge," "inboard," "outboard," and "splitter structure," respectively. As can be seen in FIG. 2, reference point $P_{N\_LE}$ is located at the leading or foremost intersection between rotational axis 34 and nose member 26. In many cases, reference point $P_{N\_LE}$ will correspond to the leading edge or foremost tip 90 of nose member 26. However, in other embodiments, such as embodiments wherein nose member 26 is not axisymmetric about rotational axis 34, reference point $P_{N\_LE}$ may not correspond to the foremost portion or leading tip of member 26. Reference point $P_{B\_LE\_IN}$ is located at the juncture between leading edge 68 of the illustrated fan blade 66 and rotor hub 75. Similarly, reference point $P_{B\_TE\_IN}$ is located at the juncture between trailing edge 70 of the illustrated fan blade 66 and rotor hub 75. Reference point $P_{SPLT\_LE}$ is located at leading edge 44 of splitter structure 32. Finally, reference point $P_{B\_LE\_OUT}$ is located at the furthest outboard region of leading edge 68 of the illustrated fan blade 66.

Utilizing the reference points identified above, several lengths of core-protecting fan module 12 can now further be defined. These lengths are called-out in FIG. 2 by a number of double-headed arrows and are, by definition, axial measurements taken along the centerline or rotational axis 34 of fan module 12 and turbofan engine 10. These lengths are labeled as $L_N$, $L_H$, and $L_{OFFSET}$, with the abbreviations "N", "H," and "OFFSET" denoting "nose," "hub," and the longitudinal offset between $P_{B\_TE\_IN}$ and leading edge 44 of splitter structure 32. As indicated in FIG. 2, length $L_N$ is measured axially from reference point $P_{N\_LE}$ to reference point $P_{B\_LE\_IN}$ along rotational axis 34, length $L_H$ is measured from reference point $P_{B\_LE\_IN}$ to reference point $P_{B\_TE\_IN}$ along axis 34, and length $L_{OFFSET}$ is measured from reference point $P_{B\_TE\_IN}$ to reference point $P_{SPLT\_LE}$ along axis 34.

Several additional radial dimensions or heights of core-protecting fan module 12 are further identified in FIG. 2. These radial dimensions include: (i) a first radial dimension ($R_{TOTAL}$) measured from rotational axis 34 (or from point $P_{N\_LE}$) to point $P_{B\_LE\_OUT}$, as taken along an axis perpendicular to rotational axis 34; (ii) a second radial dimension ($R_N$) measured from rotational axis 34 to reference point $P_{B\_LE\_IN}$, as taken along an axis perpendicular to axis 34; (iii) a third radial dimension ($R_H$) measured from reference point $P_{B\_LE\_IN}$ to reference point $P_{B\_TE\_IN}$, as taken along an axis perpendicular to axis 34; and (iv) a fourth radial dimension ($R_{OFFSET}$) measured from reference point $P_{B\_TE\_IN}$ to reference point $P_{SPLIT\_LE}$, as further taken along an axis perpendicular to axis 34. Radial dimension $R_{TOTAL}$ may thus be equivalent to a maximum radius of fan rotor 28 in an embodiment and subject to blade geometry. Radius $R_N$ may be equivalent to the maximum radius of nose member 26 in an embodiment and depending upon nose member shape. Radial dimension $R_H$ may be equivalent to the difference between the maximum and minimum radii (or heights) of rotor hub 75 in an embodiment. Finally, radial dimension $R_{OFFSET}$ may be equivalent to the radial offset (or height) between the maximum outer radius of rotor hub 75 and leading edge 44 of splitter structure 32.

Several key angular relationships may be further identified in the exemplary embodiment of FIGS. 1-2 utilizing the reference points identified above. Referring jointly to FIGS. 1-2, these angles include: (i) a first angle ($\theta_1$), which is formed between rotational axis 34 and a line extending from a reference point $P_{N\_LE}$ to reference point $P_{B\_LE\_IN}$; (ii) a second angle ($\theta_2$), which is formed between axis 34 and line extending from reference point $P_{B\_LE\_IN}$ to reference point $P_{B\_TE\_IN}$; and (iii) a third angle ($\theta_3$), which is formed between axis 34 and a line extending from reference point $P_{B\_TE\_IN}$ to reference point $P_{SPLT\_LE}$ (that is, leading edge 44 of splitter structure 32). The afore-listed reference points are again identified in FIG. 2, while angles $\theta_{1-3}$ are generically labeled in FIG. 1.

From an operational or functional standpoint, angles $\theta_{1-3}$ have a relatively complex interrelationship with each other, as well as with the fan blade count and full span stator configuration described herein. An adjustment to the value of one angle (and the corresponding changes to the structural and operational characteristics of core-protecting fan module 12) often affects the value of the other angles when arriving at a viable fan module design. In a highly generalized sense, the length, weight and cost of fan module 12 are typically negatively impacted as the first and third angles ($\theta_1$, $\theta_3$) decrease in value. Conversely, as the first angle ($\theta_1$) is enlarged, the susceptibility of fan module 12 to icing tends to increase due, at least in part, to a reduced likelihood of moisture shedding. Core protection also tends to be negatively impacted as the third angle ($\theta_3$) increases in value. The value of the second angle ($\theta_2$) likewise impacts the structural and operational characteristics of fan module 12, but in a still more complex manner. Generally, then, there exists an essentially infinite number of manners in which the first, second, and third angles ($\theta_{1-3}$) can be adjusted in designing fan module 12 with varying impacts to the structural and operational characteristics of the resulting fan module.

The foregoing notwithstanding, it has been determined that embodiments of core-protecting fan module 12 are advantageously designed and produced such that the first and second angles are each greater than the third angle ($\theta_1 > \theta_3$ and $\theta_2 > \theta_3$), while the first angle is less than the sum of the second and third angles ($\theta_1 < \theta_2 + \theta_3$). This set of angular relationships promotes dispersal of FOD in a radially outward direction away from core flow path 40 to reduce core flow path FOD ingestion, while also promoting moisture shedding within module 12 for increased resistance to icing. At the same time, this set of precise angular relationships enables fan module 12 and, more generally, turbofan engine 10 to be produced to have a relatively axially-compact and lightweight form factor, while further providing high aerodynamic performance levels. Such beneficial attributes of fan module 12 are further enhanced when nose member 26 is designed in accordance with certain key aspect ratio constraints, as described more fully below in conjunction with EQ. 1.

In embodiments of core-protecting fan module 12, the maximum aspect ratio of nose member 26 is advantageously selected such that the following equation (EQ. 1) applies, regardless of whether nose member 26 has a conical geometry (as shown in FIGS. 1-2), a bullet-shaped nose geometry, or another geometry:

$$0.5 \leq \frac{R_N}{L_N} \leq 0.65 \qquad \text{Eq. 1}$$

By selecting nose member 26 to have the aspect ratio set-forth in EQ. 1, the length and weight of nose member 26 may be minimized, while moisture shedding is promoted from nose member 26 to deter the formation and accretion of ice within fan module 12. This, in turn, may enable embodiments of core-protecting fan module 12 to be produced to lack or exclude anti-icing devices, such as dedicated electrical heating elements and/or active flow anti-icing devices. Such benefits are maximized when core-protecting fan module 12 is designed both in accordance with nose member aspect ratio specified in EQ. 1, as well as with the angular relationships set-forth in the proceeding paragraph. Still further key angular relationships or angular thresholds that may apply to embodiments of fan module 12 may include any combination of the following: (i) the first angle ($\theta_1$) may range between 27 degrees (°) and 33°, inclusive ($27° \leq \theta_1 \leq 33°$); (ii) the third angle ($\theta_3$) may be greater than at least one half the first angle ($\theta_1$) ($\theta_3 > 0.5(\theta_1)$); (iii) any difference between the first and second angles ($\theta_1$, $\theta_2$) may be less than less than 11° and, perhaps, less than one half the third angle ($\theta_3$); and/or (iv) the second angle ($\theta_2$) may be greater than 22° ($\theta_2 > 22°$).

In addition to or in lieu of the various structural characteristics discussed above, the following equation may also apply to embodiments of core-protecting fan module 10:

$$16 \leq n \leq 24 \qquad \text{EQ. 2}$$

wherein n is the precise number of fan blades 66 contained in fan rotor 28. A blade count falling within the range specified by the above equation (EQ. 2) increases the propensity of fan blades 66 and fan hub 75 to physically deflect significant portions of contaminants (moisture and FOD) in radially outward directions and, therefore, toward bypass flow path 40 during fan module operation. This, in turn, reduces FOD ingestion by the core flow path. Conversely, a blade count lower than that specified by EQ. 2 has been found suboptimal in embodiments of fan module 12 having some or all of the other structural characteristics described herein; e.g., such a reduced blade count may necessitate an undesired increase in blade thickness to withstand bird strike and/to otherwise decrease aerodynamic performance of fan rotor 28, while adding weight to fan module 12. Conversely, a blade count higher than that specified by EQ. 2 may result in an undesired weight increase and decreased performance levels, particularly when turbofan engine 10 is utilized for business and regional flight applications. The combination of EQ. 1 and EQ. 2, in particular, has a synergistic or cooperative effect providing enhanced core protection and an inherent resistance to icing, while enabling fan module 12 to remain relatively aerodynamically efficient, lightweight, and axially compact, as previously described.

Additional design characteristics may apply to core-protecting fan module 12 in addition to or in lieu of the above-described angular relationships, the nose member aspect ratio set-forth in EQ. 1, and/or the blade count parameters set-forth in EQ. 2 to further enhance the anti-icing and core-protection properties of fan module 12. These further design characteristics may include any combination of the following: (i) $R_H > R_{OFFSET}$, (ii) $L_H > 0.75(L_{OFFSET})$, (iii) $R_N < R_H + R_{OFFSET}$, and/or $$(iv) \frac{R_N}{R_{TOTAL}} < 0.32.$$

Each of the afore-listed design characteristics have been found to improve the core-protection properties of fan module 12, while further reducing or eliminating negative impacts to the overall weight, size, complexity, and performance levels of turbofan engine 10. For example, with respect to the structural relationship set-forth at romanette (ii) ($L_H>0.75(L_{OFFSET})$), this relationship ensures that the value of $L_{OFFSET}$ is constrained with respect $L_H$ (thus limiting the weight, length, and cost of fan module 12) and further that the value of $L_H$ is similarly constrained with respect to $L_{OFFSET}$ (thus limiting the length, weight, and cost of fan rotor 28 and, more generally, fan module 12).

The foregoing has thus provided multiple exemplary embodiments of aerodynamically efficient, relatively lightweight, and axially-compact fan modules, which provide enhanced core protection attributes and an inherent resistance to icing. Embodiments of the core-protecting fan module limit the detrimental core ingestion of ice-accreting water, while further detrimental core ingestion of bird material with little to no adverse impact on fan module length and weight as might otherwise result from over-extending the distance between the fan module and the splitter structure. The core-protecting fan module is advantageously (although not necessarily) produced as a single stage fan module, wherein the fan stator is a full span stator. Additionally, the fan module may adhere to a series of flow path slope characteristics, taken from the spinner nose to the splitter leading edge, which help ensure that the core is protected excessive FOD ingestion, while moisture shedding is promoted for an increased resistance to icing. Embodiments of the core-protecting fan module may also adhere to certain other fundamental structural relationships; e.g., the fan blade count and/or the nose member aspect ratio may also be constrained to further enhance core protection, as described above. Due to the inherent resistance to icing afforded by embodiments of the fan module, the core-protecting fan module can potentially be produced to lack anti-icing devices to bring about still further reductions in the overall size, weight, complexity, and cost of the fan module.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A core-protecting fan module, comprising:
a nose member;
a fan rotor downstream of the nose member, the fan rotor comprising:
a rotor hub rotatable about a rotational axis; and
a plurality of fan blades angularly spaced about the rotational axis;
a full span stator downstream of the fan rotor; and
a splitter structure downstream of the fan rotor;
wherein, in a cross-section plane containing the rotational axis, the rotational axis forms:
a first angle ($\theta_1$) with a line extending from a foremost intersection between the rotational axis and the nose member ($P_{N\_LE}$) to a point at which the rotor hub intersects a leading edge of a first fan blade included in the plurality of fan blades ($P_{B\_LE\_IN}$);
a second angle ($\theta_2$) with a line extending from $P_{B\_LE\_IN}$ to a point at which the rotor hub intersects a trailing edge of the first fan blade ($P_{B\_TE\_IN}$); and
a third angle ($\theta_3$) with a line extending from $P_{B\_TE\_IN}$ to a leading edge of the splitter structure;
wherein the first angle is greater than the third angle ($\theta_1>\theta_3$), the second angle is greater than the third angle ($\theta_2>\theta_3$), and the first angle is less than the sum of the second and third angles ($\theta_1<\theta_2+\theta_3$); and
wherein the nose member has a radius ($R_N$) measured in a radial direction from $P_{N\_LE}$ to $P_{B\_LE\_IN}$ and further has a length ($L_N$) measured along the rotational axis from $P_{N\_LE}$ to $P_{B\_LE\_IN}$, and wherein $$0.5 \leq \frac{R_N}{L_N} \leq 0.65,$$

and
wherein the rotor hub has a length ($L_H$) measured along the rotational axis from $P_{B\_LE\_IN}$ to $P_{B\_TE\_IN}$ wherein the leading edge of the splitter structure is offset from $P_{B\_LE\_IN}$ along the rotational axis by a longitudinal clearance ($L_{OFFSET}$), and wherein $L_H>0.75(L_{OFFSET})$.

2. The core-protecting fan module of claim 1 wherein the plurality of fan blades consists of a predetermined number (n) of fan blades, and wherein $16 \leq n \leq 24$.

3. The core-protecting fan module of claim 2 wherein $$\frac{R_N}{R_{TOTAL}} < 0.32,$$

and wherein $R_{TOTAL}$ is a radial dimension measured from $P_{N\_LE}$ to $P_{B\_LE\_OUT}$, as taken along an axis perpendicular to the rotational axis.

4. The core-protecting fan module of claim 2 wherein the core-protecting fan module comprises:
a first dimension ($R_N$) measured in a radial direction from $P_{N\_LE}$ to $P_{B\_LE\_IN}$;
a second dimension ($R_H$) measured in a radial direction from $P_{B\_LE\_IN}$ to $P_{B\_TE\_IN}$; and
a third dimension ($R_{OFFSET}$) measured in a radial direction from $P_{B\_TE\_IN}$ to the leading edge of the splitter structure ($P_{SPLT\_LE}$); and
wherein $R_N<R_H+R_{OFFSET}$.

5. The core-protecting fan module of claim 2 wherein $\theta_3>0.5(\theta_1)$.

6. The core-protecting fan module of claim 2 wherein $\theta_2>22$ degrees.

7. The core-protecting fan module of claim 2 wherein the first angle ($\theta_1$) and the second angle ($\theta_2$) differ by less than one half the third angle ($\theta_3$).

8. The core-protecting fan module of claim 2 wherein 27 degrees$\leq\theta_1\leq$33 degrees.

9. The core-protecting fan module of claim 2 wherein the full span stator comprises a first stator vane having an inboard trailing edge portion and an outboard trailing edge portion;
wherein the inboard trailing edge portion is located forward of the leading edge of the splitter structure, as taken along the rotational axis; and wherein the outboard trailing edge portion is located aft of the leading edge of the splitter structure, as taken along the rotational axis.

10. The core-protecting fan module of claim 2 wherein the plurality of fan blades and the rotor hub are integrally formed as a blisk.

11. A core-protecting fan module, comprising:
a full span stator having a plurality of stator vanes;
a fan rotor upstream of the full span stator, the fan rotor comprising:
a rotor hub rotatable about a rotational axis; and
a plurality of fan blades extending from the rotor hub and angularly spaced about the rotational axis;
a nose member adjacent and upstream of the rotor hub, the nose member comprising:
a radius ($R_N$) measured in a radial direction from a foremost intersection between the rotational axis and the nose member ($P_{N\_LE}$) to an intersection between the rotor hub and a leading edge of a first fan blade in the plurality of fan blades ($P_{B\_LE\_IN}$); and
a length ($L_N$) measured along the rotational axis from $P_{N\_LE}$ to $P_{B\_LE\_IN}$;
wherein the plurality of fan blades consists of a predetermined number (n) of fan blades;
wherein $16 \leq n \leq 24$, while $$0.5 \leq \frac{R_N}{L_N} \leq 0.65,$$

and
wherein the rotor hub has a length ($L_H$) measured along the rotational axis from $P_{B\_LE\_IN}$ to $P_{B\_TE\_IN}$, wherein the leading edge of the splitter structure is offset from $P_{B\_LE\_IN}$ along the rotational axis by a longitudinal clearance ($L_{OFFSET}$), and wherein $L_H > 0.75(L_{OFFSET})$.

12. The core-protecting fan module of claim 11 further comprising:
a core flow path downstream of the fan rotor;
a bypass flow path downstream of the fan rotor; and
a splitter structure partitioning the bypass flow path and the core flow path, the splitter structure comprising a leading edge offset from $P_{B\_LE\_IN}$ along the rotational axis by the longitudinal clearance ($L_{OFFSET}$).

13. The core-protecting fan module of claim 12 wherein the full span stator comprises a first stator vane having an inboard trailing edge portion and an outboard trailing edge portion;
wherein the inboard trailing edge portion is located forward of the leading edge of the splitter structure, as taken along the rotational axis; and
wherein the outboard trailing edge portion is located aft of the leading edge of the splitter structure, as taken along the rotational axis.

14. The core-protecting fan module of claim 13 wherein the rotor hub has a radial dimension ($R_H$) measured in a radial direction from $P_{B\_LE\_IN}$ to a point at which the rotor hub intersects a trailing edge of the first fan blade ($P_{B\_TE\_IN}$), and wherein $R_H > R_{OFFSET}$.

15. The core-protecting fan module of claim 11 wherein, in a cross-section plane containing the rotational axis, the rotational axis forms:
a first angle ($\theta_1$) with a line extending from $P_{N\_LE}$ to $P_{B\_LE\_IN}$;
a second angle ($\theta_2$) with a line extending from $P_{B\_LE\_IN}$ to a point at which the rotor hub intersects a trailing edge of the first fan blade ($P_{B\_TE\_IN}$); and
a third angle ($\theta_3$) with a line extending from $P_{B\_TE\_IN}$ to the leading edge of the splitter structure;
wherein $\theta_1 > \theta_3$, while $\theta_2 > \theta_3$.

16. The core-protecting fan module of claim 15 wherein $\theta_1 < \theta_2 + \theta_3$.

17. The core-protecting fan module of claim 15 wherein 27 degrees $\leq \theta_1 \leq$ 33 degrees.

18. A turbofan engine, comprising:
a compressor section; and
a fan module upstream of the compressor section, the fan module comprising:
a nose member;
a fan rotor downstream of the nose member, the fan rotor including a rotor hub rotatable about a rotational axis and a plurality of fan blades angularly spaced about the rotational axis;
a full span stator downstream of the fan rotor; and
a splitter structure downstream of the fan rotor;
wherein, in a cross-section plane containing the rotational axis, the rotational axis forms:
a first angle ($\theta_1$) with a line extending from a foremost intersection between the rotational axis and the nose member ($P_{N\_LE}$) to a point at which the rotor hub intersects a leading edge of a first fan blade included in the plurality of fan blades ($P_{B\_LE\_IN}$);
a second angle ($\theta_2$) with a line extending from $P_{B\_LE\_IN}$ to a point at which the rotor hub intersects a trailing edge of the first fan blade ($P_{B\_TE\_IN}$); and
a third angle ($\theta_3$) with a line extending from $P_{B\_TE\_IN}$ to a leading edge of the splitter structure;
wherein the first angle is greater than the third angle ($\theta_1 > \theta_3$), the second angle is greater than the third angle ($\theta_2 > \theta_3$), the first and angle is less than the sum of the second and third angles ($\theta_1 < \theta_2 + \theta_3$), and 27 degrees $< \theta_1 <$ 33 degrees;
wherein the nose member has a radius ($R_N$) measured in a radial direction from $P_{N\_LE}$ to $P_{B\_LE\_IN}$ and further has a length ($L_N$) measured along the rotational axis from $P_{N\_LE}$ to $P_{B\_LE\_IN}$, and wherein $$0.5 \leq \frac{R_N}{L_N} \leq 0.65; \text{ and}$$

wherein the rotor hub has a length ($L_H$) measured along the rotational axis from $P_{B\_LE\_IN}$ to $P_{B\_TE\_IN}$, wherein the leading edge of the splitter structure is offset from $P_{B\_LE\_IN}$ in a longitudinal direction by a longitudinal clearance ($L_{OFFSET}$), and wherein $L_H > 0.75(L_{OFFSET})$.

* * * * *